May 22, 1951 B. H. PARKS 2,553,784
FISHING REEL
Filed Sept. 28, 1946 2 Sheets-Sheet 2
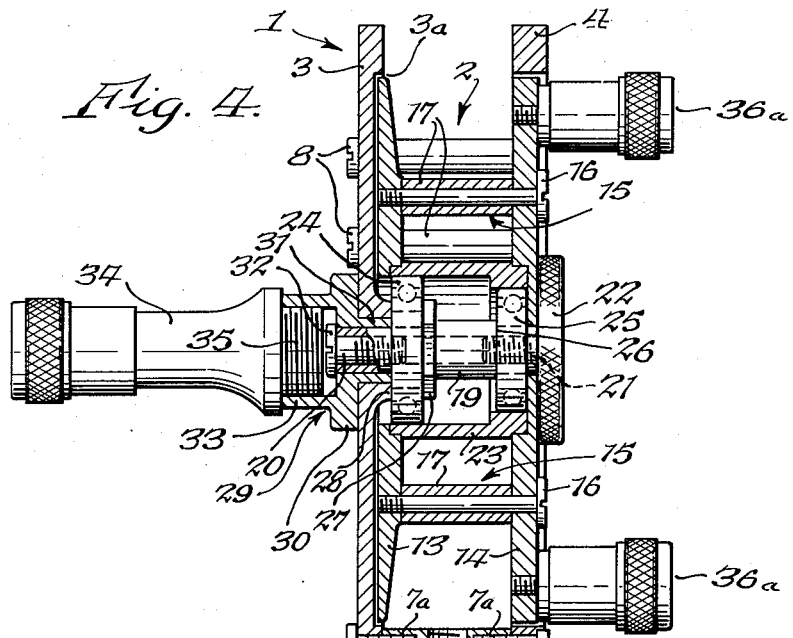
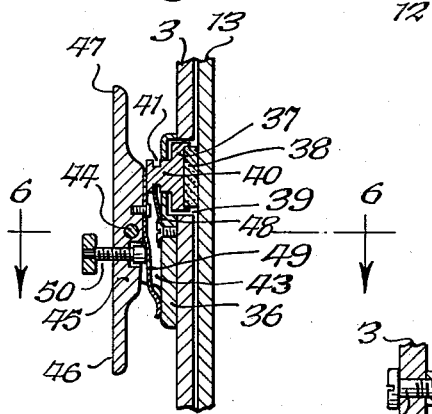
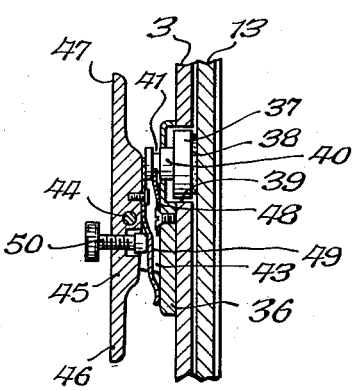
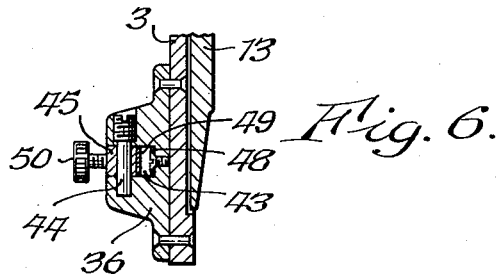
INVENTOR
Bert H. Parks
BY
John Powers
ATTORNEY Patented May 22, 1951

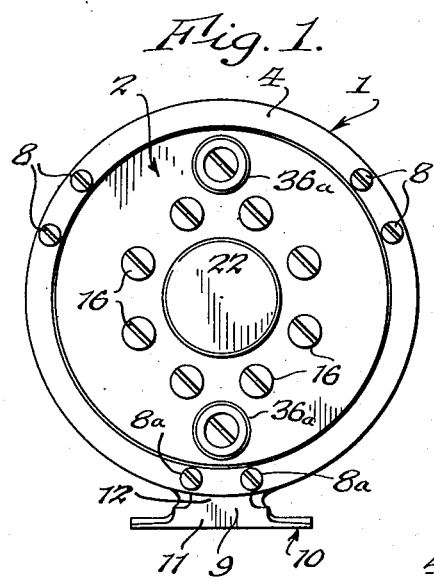
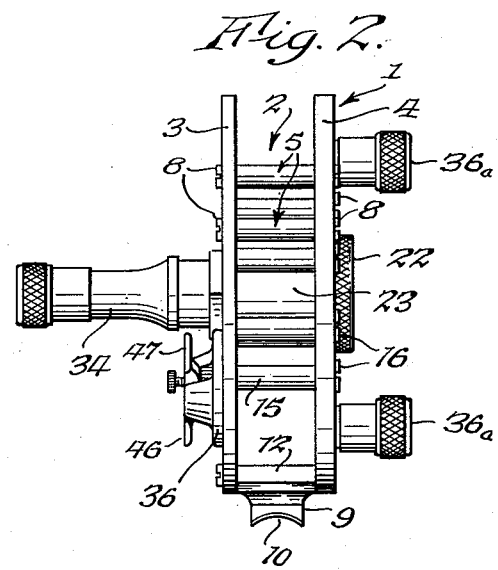
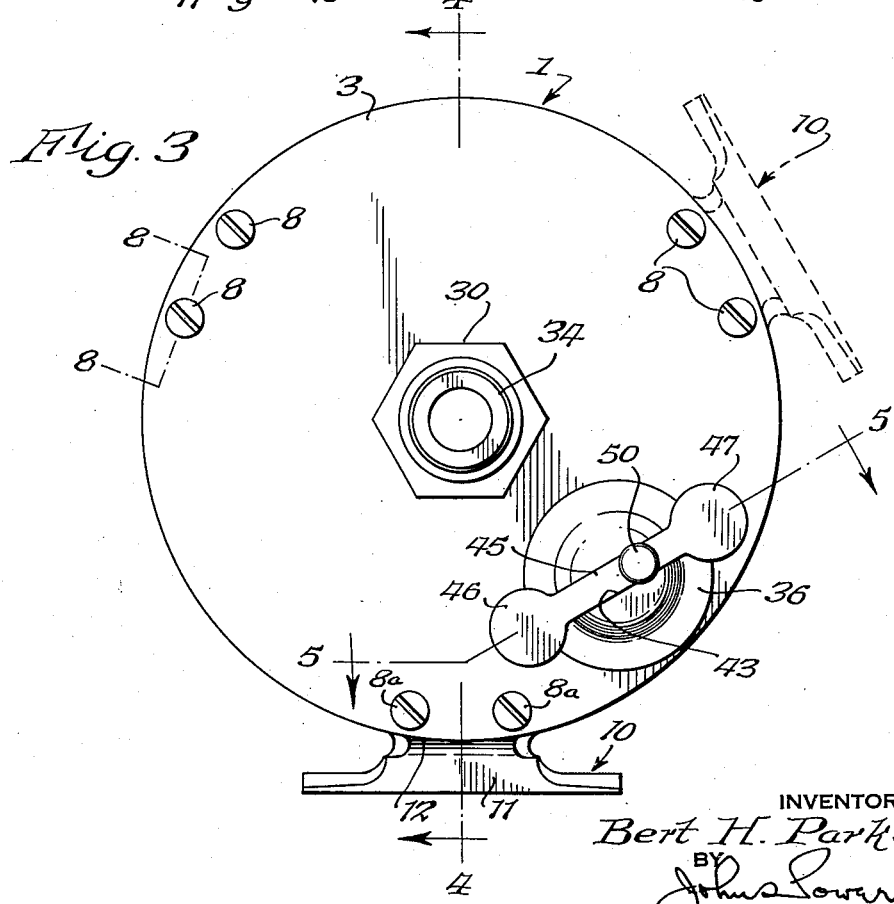

2,553,784

UNITED STATES PATENT OFFICE 2,553,784

FISHING REEL

Bert H. Parks, Buffalo, N. Y.

Application September 28, 1946, Serial No. 700,078

5 Claims. (Cl. 242—84.5)

This invention relates to improvements in fishing reels and proposes a reel which is particularly intended for use when large game fish, such as are within a range of weight from fifteen pounds up to a hundred or more, are sought, as in deep sea fishing or in fishing for large fresh water varieties, for example muskellunge.

In such fishing a prolonged period of care and skill is required in playing the fish in order to bring it to the gaff or landing net; and sustained physical exertion is imposed upon the angler in combating the rushes and lunges of the fish and gradually bringing it to a position within reach.

The principal object of the invention is to provide a reel which will promote greater accuracy and skill in playing the fish, which will sensibly lessen the physical exertion required of the angler, and which will have provision by which it may readily be adapted to the requirements of either right or left handed individuals.

A further object is to provide a reel in which the cage and reel elements and associated ball bearings are so organized as to provide for quick and facile disassembly to enable ready access to the ball bearings for the purposes of cleaning, lubrication, repair or renewal.

In the attainment of these objects the invention is characterized by an improved mechanism which enables convenient and immediate selection in respect to a three phase control of the reel action, namely, a normal phase in which there is an automatically applied light braking action; a free running action controlled by thumb pressure; and a heavy braking action controlled by thumb pressure. In accordance with the invention the mechanism is arranged at the side of the reel opposite the side from which the reel handles project with its controlling element arranged for thumb operation, both in the free running and heavy braking phases; the braking element is arranged for engagement with a side wall of the reel element; and provision is made for quick and accurate selection of the degree of the automatically applied braking pressure in the normal phase within limits from light braking action to heavy braking action. The reel structure includes a cage element and a reel mounting element in connected relation, the cage element carrying the reel action selecting mechanism which is mounted at a fixed point along the peripheral extent of the cage element; and the invention is also characterized by provision for the convenient adjustment of the connected cage element and reel mounting element whereby the peripheral position of the latter in relation to the fixed position of the reel action selecting mechanism upon the cage element may be so altered as to adapt the reel for use with equal efficiency by either right or left handed individuals. The cage element and the reel element have associated ball bearings; and the invention is further characterized by the provision for quick and facile separation of these elements whereby to give complete access to the ball bearings for purposes of cleaning, lubrication, repair or renewal and for the equally quick and facile assembly and connection of the cage and reel elements and the associated ball bearings.

In the accompanying drawings:

Figure 1 is a side elevation of a reel in accordance with the invention.

Figure 2 is a front elevation thereof.

Figure 3 is an enlarged side elevation of the reel showing the side thereof opposite to the side shown in Figure 1.

Figure 4 is a vertical section on the line 4—4 of Figure 3, looking in the direction of the arrows.

Figure 5 is a detail section on the line 5—5 of Figure 3, showing the reel action selecting mechanism in the normal phase in which there is an automatically applied light braking action, looking in the direction of the arrows.

Figure 6 is a detail section on the line 6—6 of Figure 5, looking in the direction of the arrows.

Figure 7 is a section similar to that of Figure 5 but showing an adjustment which effects a heavier braking action in the normal phase.

Figure 8 is a detail section on the line 8—8 of Figure 3.

The reel includes cage and reel elements designated generally as 1 and 2, respectively.

The cage element includes a wall 3 and a ring 4 suitably spaced and in parallel planes. The wall 3 and ring 4 are at once connected and held properly spaced by fastenings 5 which preferably consist of transversely arranged bars 6, the ends of which abut the inner faces of the wall 3 and ring 4 and are formed with centrally located openings terminating in threaded end portions 7, and screws 8, the heads of which engage against the outer faces of the wall 3 and ring 4 and the shanks of which extend through openings in said wall and ring respectively and are threaded for engagement, in the portions 7. Obviously by threading the screws 8 into the portions 7 to the required extent the wall 3 and ring 4 are rigidly connected and maintained in parallel planes and in properly spaced relation. The reel mounting element 9 which serves for the connection of the reel to the rod (not shown) is connected to the cage element and is also utilized for the connection of the wall 3 and ring 4 in the manner described. Thus the reel mounting element 9 includes a rod engaging shoe 10 and a centrally located body portion 11 which terminates in a head 12, the transverse dimension of which conforms to the spacing of the wall 3 and ring 4. The head 12 fits between the wall 3 and ring 4 and its sides abut the inner faces of said wall and ring. The head 12 is formed with recesses 7a which are counterparts of the threaded portions 7 and is connected to the wall 3 and ring 4 by screws 8a which are counterparts of the screws 8. The fastenings are preferably arranged in pairs, the head 12 of the shoe 10 being the functional equivalent of a pair of the bars 6 and at each of its sides being connected by a pair of screws 8a to the wall 3 and 4 respectively.

The reel element 2 includes walls 13 and 14 suitably spaced and in parallel planes. These walls are at once connected and held properly spaced by fastenings 15 which consist of a connecting bolt 16 and a spacing sleeve 17, the ends of which abut the inner faces of the walls 13 and 14. The wall 13 adjoins the cage wall 3 which preferably has a recess 3a within which the wall 13 is arranged. The wall 14 is arranged within the inner circumferential face of the ring 4 with its inner face preferably flush with the inner face of said ring. The walls 13 and 14 carry a centrally located transverse arbor 19 which at its ends projects through openings in said walls and is formed with threaded portions for cooperation with screws 20 and 21 arranged respectively adjacent the cage wall 3 and the wall 14 of the reel element 2, the screw 21 preferably having an enlarged knurled head 22 which permits its ready manual connection to and disconnection from the arbor 19.

The walls 13 and 14 also carry a sleeve 23 concentric to the arbor 19 which has rabbeted end portions for press fit engagement in suitable recesses in the adjoining inner faces of the walls 13 and 14.

The arbor 19 and the sleeve 23 cooperate in the support of ball bearings 24 and 25 located adjacent the cage wall 3 and reel wall 14 respectively. The outer rings of the ball bearings fit within the end portions of the sleeves 23 with such closeness that in the use of the reel they rotate with said sleeve. The arbor 19 is formed with reduced end portions upon which the inner rings of the ball bearings are fitted, these remaining stationary during the operation of the reel. The inner ring of the ball bearing 25 is confined between the reel wall 14 and a shoulder 26 provided by the adjacent reduced end portion of the arbor 19. The inner ring of the ball bearing 24 is confined between a collar 27 formed upon or otherwise fixed to the arbor 19 and a central tubular boss 28 formed upon and projecting inward from the cage wall 3. The cage wall 3 carries a centrally located member 29 having a base 30 which adjoins the outer face of the cage wall and a sleeve 31 which preferably has a press fit within the central opening of the boss 28 and surrounds the adjacent reduced portion of the arbor 19, the latter being secured in position by the screw 20, the head 32 of which engages against the base 30 of the member 29.

The member 29 is formed with an outwardly projecting internally threaded collar 33, the purpose of which is to support an auxiliary centrally located handle 34 which is co-axial with the reel and has at its inner end a threaded extension 35 for engagement in the collar 33. The reel wall 14 carries the usual lateraly and outwardly projecting, freely rotatable, cranks 36a by which means the reel element may be rotated to pull in the line and wind it upon the reel.

Access is had to the ball bearings 24 and 25 for the purposes of cleaning and lubrication by removing the screw 21 from the arbor 19. Thereupon the reel element, of which the cylinder 23 may be regarded as a part, may be pulled away from the cage element as a unit and in such removal carries with it the ball bearing 25, leaving the arbor 19 and bearing 24 in association with the cage element. The parts are reassembled by fitting the reel element and cage element together in the relation shown in the drawings and thereupon engaging the screw 21 with the arbor 19 and tightening it to the extent required. In order to eliminate any possibility of the screw 21 being turned by the cage element in its rotation any suitable lubricant may be applied between the adjoining faces of the knob 22 and reel wall 14.

If it be desired to have access to the ball bearing 24 for the purpose of repair or substitution the handle 34 is unscrewed from the collar 33 and the screw 20 is removed. The reel and cage elements are then separated in the manner above explained after which the arbor 19 is pulled away from the sleeve 31 to permit such complete access to the ball bearing 24 as may be required for the purpose in view. If the repair or renewal of the ball bearing 25 be required the reel element is separated from the cage element and the bearing 25 removed from the cylinder 23 by any suitable mechanism which will overcome the press fit and, on replacement, affect the press fit.

A bracket 36 is rigidly attached to the cage wall 3 and supports other parts of the reel action selecting mechanism. Its location upon the cage wall 3 is such that the mechanism is readily and naturally controlled by the thumb. The drawings (Figures 2 and 3) assume the use of the reel by a right handed individual, the thumb of the left hand being used to control the reel action selecting mechanism.

The braking pressure is effected by a shoe 37 carrying a projecting body 38 of friction material which with braking effect engages the adjacent face of the reel wall 13. The shoe 37 is laterally movable through an opening 39 in the cage wall 3 and is provided with a stud 40 having an annular groove 41, the stud 40 projecting outward through an opening in the bracket 36 which is formed on its underface with a recess to accommodate the shoe 37 and on its outer face with a diametrically extending recess 43 within which the stud is located. The parts of the bracket at the sides of the recess 43 provide ears which support a pivot pin 44 located suitably inward of the stud 40 and upon which is mounted a two-armed lever 45 having at its opposite ends thumb pieces 46 and 47, the body portion of this lever being located within the recess 43. The under face of the lever 45 engages the end face of the stud 40, such engagement being maintained by a leaf spring 48 fixed on the bracket 36 and having its free end forked for engagement in the groove 41.

The lever 45 is normally held in position to cause the shoe 37 with its body of friction material 38 to apply light braking pressure upon the adjacent face of the reel wall 13. This is accomplished by any suitable spring arrangement. As shown, a leaf spring 49 has one end secured to the underface of the lever 45 at a point between the pivot pin 44 and the stud 40 and its opposite free end in engagement with the base of the bracket 36. The spring 49 exerts its pressure upon the lever 45 at a point suitably inward of the pivot pin 44, the latter being located between the stud 40 and the point of engagement of the spring 49 with the lever 45. At this point provision is preferably made for the adjustable variation of the pressure of the spring. As shown, a screw 50 is threaded through the lever and its inner end is formed to engage the spring, its outer end having a knurled head. The pressure of the spring 49 upon the lever is directly exerted upon the inner end of the screw 50, which when turned to move inward progressively increases the pressure of the spring and when backed off progressively relieves such pressure.

In the use of the reel the spring 49 effects light braking pressure upon the reel wall 13. In casting, the thumb piece 46 is pressed inward in order to eliminate any breaking pressure and to enable the reel to run free. When the cast is completed the thumb piece is released and the spring 49, in the manner described, causes light braking pressure to be exercised upon the reel wall 13, this normal light braking pressure being sufficient to prevent the line from paying out under the pull of the bait or lure when trolling. When the bait is taken if it be desirable that the fish have a free run the thumb piece 46 is depressed, thereby completely to disengage the friction body 38 from the reel wall 13. On the other hand if it is desirable to curb or arrest the run of the fish, braking pressure is directly applied in sufficient degree by depressing the thumb piece 47, the friction body 38 thus being directly pressed against the reel wall 13 in such degree as circumstances may require. In pulling in the fish, in order that the angler's effort may not be hampered by braking pressure, the thumb piece 46 is depressed to permit the reel element to be freely rotatable. The reel element is then rotated by means of either of the cranks 36 in a direction to wind the line upon the transverse fastenings 15. The lateral thrust of the reel element under the pressure of the friction body 38 is exerted against the enlarged head 22 of the screw 21. By the exercise of suitable skill and judgment in the manipulation of the lever 45 the fish is ultimately brought within reach of the gaff or net. Depending on the environment and the individual, it may be desirable to vary the degree of light braking pressure normally applied. For this purpose the screw 50 is utilized in the manner above explained.

The connecting bars 6 between the wall 3 and ring 4 are preferably arranged in pairs having a mutual spacing of 120 degrees; and the head 12 of the reel mounting element has a similar spacing relatively to said bars. The connection of the reel mounting element to the cage element is such that it may readily be positioned along the periphery of the cage element at one side or the other of the reel action selecting mechanism. As above noted the drawing assumes the reel to be used by a right handed individual in which case the reel action selecting mechanism is at the left side of the reel (Figure 2 being considered) and somewhat above and to the right of the reel mounting element 9 (Figure 3 being considered). In order to adapt the reel for use by a left handed individual the reel mounting element is removed from between the cage wall 3 and ring 4 and the fastenings 5 immediately above the reel action selecting element (Figure 3 being considered) are also removed. The parts thus removed are interchanged in position whereby the reel mounting element will have the position shown in broken lines in Figure 3 and the connecting bars 6 which originally occupied this position will be placed in the original position of the reel mounting element. With these parts thus interchanged in position the reel will be adapted for use by a left handed individual in which use the reel mounting element will be at the lower side of the reel (in the same position as shown in Figure 3), the reel action selecting mechanism will be at the right side of the reel (for manipulation by the thumb of the right hand of the angler), the auxiliary handle 34 will project from the right side of the reel, and the cranks 36 will project from the left side of the reel.

In deep sea fishing the rod is usually fitted in the socket carried by a belt worn by the angler. As the fish lunges with violence to and fro a considerable degree of physical strain is imposed upon the angler. The purpose of the auxiliary handle 34 is substantially to reduce and alleviate this strain. The angler, by means of the handle 34, readily uses the strength of his arm to oppose the lunges of the fish, at the same time having the thumb of the hand which grasps the handle 34 free for the manipulation of the reel action selecting mechanism in the manner above described and having the other hand free for the rotation of the reel element whereby to pull in the line and wind it upon the transverse fastenings 15 of the reel element.

I claim:

1. In a fishing reel, in combination, a cage element having a wall, a reel element including connected walls spaced in parallel planes, one wall of the reel element adjoining the wall of the cage element, a central transverse arbor carried by the cage element and upon which the reel element is rotatably mounted and a reel action selecting mechanism mounted upon and projecting laterally outward from the wall of the cage element, said mechanism including a supporting bracket secured to the cage wall, a brake shoe, the cage wall having an opening through which the brake shoe extends and the brake shoe engaging the surface of the reel wall which adjoins the cage wall, the brake shoe having an outwardly projecting stud and the bracket having an opening through which the stud projects, a two armed lever pivotally mounted upon the bracket and having terminal thumb pieces, the lever at one side of its pivot engaging the stud, and a spring reacting between the lever and the bracket and normally causing the lever to press the brake shoe with light braking pressure against said reel wall, movement of the lever in one direction by pressure applied to one thumb piece relieving the pressure of the lever upon the brake shoe whereby the reel element may run free and movement of the lever in the opposite direction by pressure applied to the other thumb piece increasing the pressure of the brake shoe upon said reel wall.

2. A fishing reel as set forth in claim 1 wherein the bracket is formed on its outer face with a recess, the opposite walls of which provide ears for the mounting of the pivot of the lever, and the body portion of the lever fits within said recess.

3. A fishing reel as set forth in claim 1 wherein means is provided for adjustably regulating the pressure of the spring in order correspondingly to regulate the normally applied light braking pressure.

4. A fishing reel as set forth in claim 1 wherein the lever carries a screw, its pivot is located between the screw and the stud, and the screw engages the spring, transmits its thrust to the lever, and serves for the regulation of its normally applied pressure.

5. In a fishing reel, in combination, a cage element having a wall, a reel element including connected walls spaced in parallel planes, one wall of the reel element adjoining the wall of the cage element, a central transverse arbor carried by the cage element, the wall of the cage element and the walls of the reel element having openings through which the end portions of the arbor project, a transverse cylinder carried by the reel element in surrounding relation to the arbor, ball bearings mounted upon the arbor and respectively adjoining the wall of the cage element and the wall of the reel element which is opposite the wall of the cage element, the ball bearings being arranged between the arbor and the cylinder, the ball bearing which adjoins the wall of the cage element being confined adjacent said wall and the other ball bearing being carried by the cylinder, the arbor having its end portions internally threaded, and securing screws fitted in said end portions, the screw adjacent the wall of the reel element which is opposite the wall of the cage element having an enlarged head, and means carried by the wall of the cage element for applying braking pressure to the adjoining wall of the reel element, said enlarged head receiving the thrust of the applied braking pressure and the removal of the screw upon which said head is provided enabling the disassembly of the reel element from the cage element, the reel element in such disassembly carrying with it the cylinder and the ball bearing carried by the cylinder, the subsequent removal of the other screw enabling the disassembly of the arbor and the other ball bearing from the cage element, said wall of the reel element opposite the wall of the cage element carrying a projecting handle by which the reel element may be rotated, and the wall of the cage element carrying upon its outer face a centrally located member having a base and an outwardly projecting internally threaded collar, the base having an opening through which the adjacent end of the arbor projects and the screw which is fitted in said adjacent end of the arbor having a head which bears against said base, and a centrally located outwardly projecting auxiliary handle having a threaded shank which engages in said collar, the removal of said auxiliary handle from said collar providing for access to said screw for the removal thereof from the arbor.

BERT H. PARKS.

REFERENCES CITED

The following references are of record in the file of this patent:

UNITED STATES PATENTS

| Number | Name | Date |
|---|---|---|
| 397,198 | Meisselbach et al. | Feb. 5, 1889 |
| 403,733 | Bradford | May 21, 1889 |
| 1,865,066 | Walberg | June 28, 1932 |
| 1,871,386 | Pfleuger | Aug. 9, 1932 |
| 2,083,927 | Sinex | June 15, 1937 |
| 2,384,561 | Muffett | Sept. 11, 1945 |

FOREIGN PATENTS

| Number | Country | Date |
|---|---|---|
| 136,217 | Great Britain | Dec. 1, 1919 |